US011120802B2

(12) United States Patent
Church et al.

(10) Patent No.: US 11,120,802 B2
(45) Date of Patent: *Sep. 14, 2021

(54) DIARIZATION DRIVEN BY THE ASR BASED SEGMENTATION

(71) Applicant: International Business Machines Corporation, Armonk, NY (US)

(72) Inventors: Kenneth W. Church, Dobbs Ferry, NY (US); Dimitrios B. Dimitriadis, White Plains, NY (US); Petr Fousek, Litomerice (CZ); Miroslav Novak, Mohegan Lake, NY (US); George A. Saon, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,127

(22) Filed: Nov. 21, 2017

(65) Prior Publication Data
US 2019/0156832 A1    May 23, 2019

(51) Int. Cl.
| G10L 15/26 | (2006.01) |
| G10L 25/78 | (2013.01) |
| G10L 15/08 | (2006.01) |
| G10L 25/51 | (2013.01) |
| G10L 17/04 | (2013.01) |

(Continued)

(52) U.S. Cl.
CPC .............. *G10L 15/26* (2013.01); *G10L 15/08* (2013.01); *G10L 17/00* (2013.01); *G10L 17/04* (2013.01); *G10L 25/51* (2013.01); *G10L 25/78* (2013.01); *G10L 2015/0631* (2013.01); *G10L 2015/088* (2013.01)

(58) Field of Classification Search
CPC ..................................................... G10L 17/005
USPC .................................................. 704/235, 246
See application file for complete search history.

(56) References Cited

U.S. PATENT DOCUMENTS

| 5,617,508 A | 4/1997 | Reaves |
| 6,421,645 B1 * | 7/2002 | Beigi ................ G06F 17/30746 |
| | | 704/251 |

(Continued)

FOREIGN PATENT DOCUMENTS

GB    2489489    10/2012

OTHER PUBLICATIONS

Jousse et al., "Automatic Named Identification of Speakers Using Diarization and ASR Systems", IEEE International Conference on Acoustics, Speech and Signal Processing, Taipei, Taiwan, Apr. 2009, pp. 4557-4560.

(Continued)

*Primary Examiner* — Shaun Roberts
(74) *Attorney, Agent, or Firm* — Van Leeuwen & Van Leeuwen; David K. Mattheis

(57) ABSTRACT

An approach is provided that receives an audio stream and utilizes a voice activation detection (VAD) process to create a digital audio stream of voices from at least two different speakers. An automatic speech recognition (ASR) process is applied to the digital stream with the ASR process resulting in the spoken words to which a speaker turn detection (STD) process is applied to identify a number of speaker segments with each speaker segment ending at a word boundary. A speaker clustering algorithm is then applied to the speaker segments to associate one of the speakers with each of the speaker segments.

20 Claims, 8 Drawing Sheets

(51) Int. Cl.
*G10L 17/00* (2013.01)
*G10L 15/06* (2013.01)

(56) References Cited

U.S. PATENT DOCUMENTS

| | | | | |
|---|---|---|---|---|
| 7,266,189 | B1* | 9/2007 | Day | H04M 3/56 |
| | | | | 379/158 |
| 7,881,930 | B2 | 2/2011 | Faisman et al. | |
| 8,554,562 | B2* | 10/2013 | Aronowitz | G10L 17/02 |
| | | | | 704/245 |
| 8,731,940 | B2 | 5/2014 | Harma | |
| 9,368,116 | B2 | 6/2016 | Ziv et al. | |
| 9,449,617 | B2 | 9/2016 | Yassa et al. | |
| 9,881,617 | B2* | 1/2018 | Sidi | G10L 17/02 |
| 2003/0182118 | A1* | 9/2003 | Obrador | G06F 17/30787 |
| | | | | 704/246 |
| 2007/0071206 | A1* | 3/2007 | Gainsboro | H04M 3/2281 |
| | | | | 379/168 |
| 2014/0074467 | A1* | 3/2014 | Ziv | G10L 25/78 |
| | | | | 704/235 |
| 2014/0142944 | A1 | 5/2014 | Ziv et al. | |
| 2015/0310863 | A1 | 10/2015 | Chen et al. | |
| 2016/0027438 | A1* | 1/2016 | Chu | G10L 15/02 |
| | | | | 704/233 |
| 2016/0154782 | A1* | 6/2016 | Romano | H04M 3/5175 |
| | | | | 704/9 |
| 2016/0179831 | A1 | 6/2016 | Gruber et al. | |
| 2016/0217792 | A1* | 7/2016 | Gorodetski | G10L 17/04 |
| 2016/0253315 | A1* | 9/2016 | Isensee | H04L 51/02 |
| | | | | 704/9 |
| 2016/0283185 | A1 | 9/2016 | McLaren et al. | |
| 2017/0069226 | A1* | 3/2017 | Spinelli | G09B 5/04 |
| 2017/0084295 | A1 | 3/2017 | Tsiartas et al. | |
| 2017/0133041 | A1 | 5/2017 | Mortensen et al. | |
| 2018/0286412 | A1* | 10/2018 | Amsterdam | G10L 17/22 |

OTHER PUBLICATIONS

Church et al., "Speaker Diarization: A Perspective on Challenges and Opportunities From Theory to Practice," 2017 IEEE International Conference on Acoustics, Speech and Signal Processing (ICASSP), Mar. 2017, New Orleans, LA, US, pp. 4950-4954. Note—This Is a Grace Period Disclosure Under 35 U.S.C. 102(b)(1)(A) as Stated in the Specification.

Dimitriadis et al., "Developing On-Line Speaker Diarization System," Interspeech 2017, Aug. 2017, Stockholm, Sweden, pp. 2739-2743. Note—This Is a Grace Period Disclosure Under 35 U.S.C. 102(b)(1)(A) as Stated in the Specification.

"List of IBM Patents or Patent Applications Treated as Related," Letter from Leslie A. Van Leeuwen, Nov. 21, 2017, 1 page.

Church et al., "Diarization Driven by Meta-Information Identified in Discussion Content," U.S. Appl. No. 15/819,158, filed Nov. 21, 2017, 43 pages.

* cited by examiner

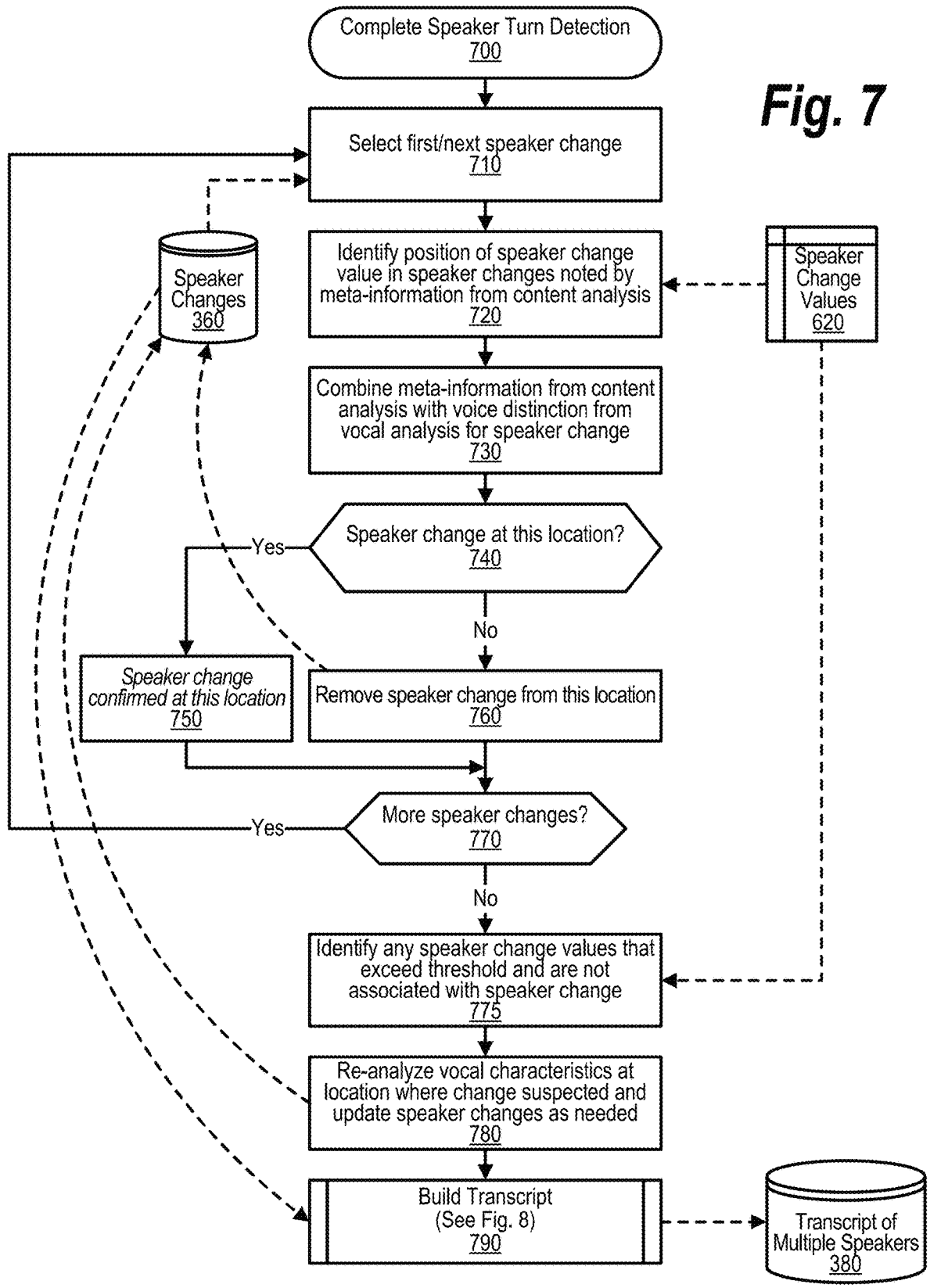

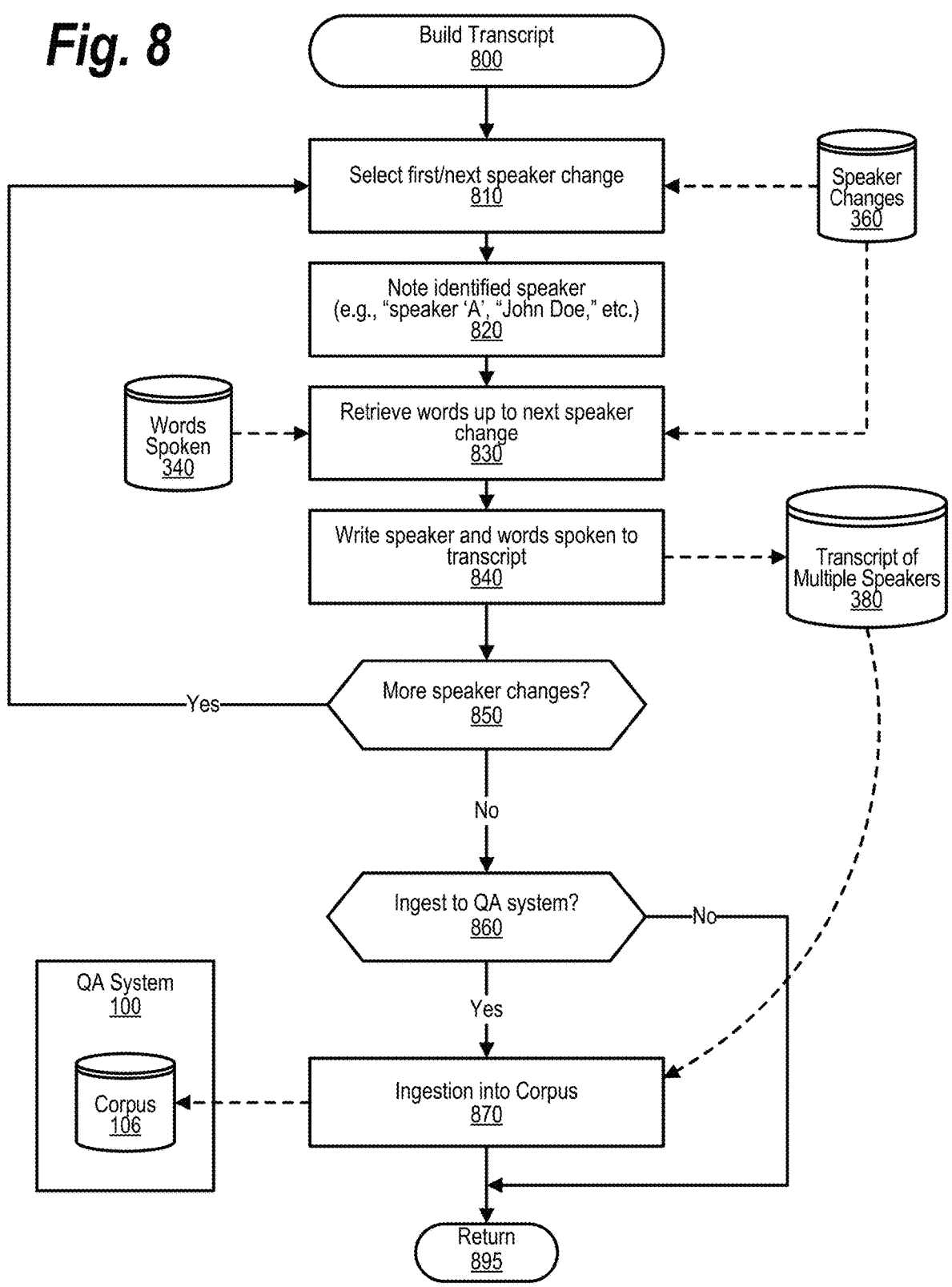

DIARIZATION DRIVEN BY THE ASR BASED SEGMENTATION

STATEMENT REGARDING PRIOR DISCLOSURES BY THE INVENTOR OR A JOINT INVENTOR

A first "grace period disclosure" was published in March 2017. This publication was entitled "SPEAKER DIARIZATION: A PERSPECTIVE ON CHALLENGES AND OPPORTUNITIES FROM THEORY TO PRACTICE." The joint authors of this publication were Kenneth Church, Weizhong Zhu, Josef Vopicka, Jason Pelecanos, Dimitrios Dimitriadis, and Petr Fousek. Kenneth Church, Dimitrios Dimitriadis, and Petr Fousek are co-inventors of the invention described and claimed in the present patent application, and are named as such in the present patent application U.S. filing documents. However, Weizhong Zhu, Josef Vopicka, and Jason Pelecanos, although co-authors of the above-referenced publication did not contribute material to this publication that was related to the subject matter of the present patent application. Thus, any material in the above-referenced publication that is related to the present patent application was written by the present co-inventors, Kenneth Church, Dimitrios Dimitriadis, and Petr Fousek, and no other person.

A second "grace period disclosure" was published in August 2017. This publication was entitled "Developing On-Line Speaker Diarization System". The joint authors of this publication were Dimitrios Dimitriadis and Petr Fousek who are co-inventors of the invention described and claimed in the present patent application, and are named as such in the present patent application U.S. filing documents.

BACKGROUND

The goal of the diarization systems is to extract information about the speakers found in an audio document, such as the number of speakers, their turns, the timing of their turns, etc. In more detail, the diarization systems first find the speaker turns, and then extract the corresponding information about the homogeneous speech segments attributed to a single speaker. The state-of-the-art approach for finding such turns is to use a sliding window of fixed length and investigate whether the speakers have changed inside that window. This brute-force approach estimates two Gaussian models for the left and right sub-segments and then compares the corresponding statistics. Once these candidate speaker turns are found, a second module assigns these sub-segments to speaker clusters. Most often, the brute-force system creates a big number of false positives (i.e. the system finds a speaker turn when there is no actual turn). In order to remove some of these false positives, the current systems rely on the clustering post-processing scheme. However, less accurate turn detection actually hurts the clustering process as well. There are several problems with this approach: First, the audio in this window may contain non-verbal acoustic cues, such as silence, noise, background speech, etc. These cues cause artifacts that may skew the estimated statistics, thus make the turn detection process noisier. Further, these artifacts can also deteriorate the clustering performance, lowering the overall diarization performance. Second, the detected turns are often found in the middle of a word, and consequently the ASR (automated speech recognition) performance will be lower (when diarization is combined with an ASR system). In more detail, there is no constraint where the speaker turns can be found, so it is possible that they can be found in the middle of a word, or even when there is a transition from silence to speech (and vice versa). The ad-hoc turns create discontinuities in the speech flow and thus, ASR performance becomes worse. Finally, there is no constraint in the length of the two sub-segments. In such cases, sub-optimal statistics estimation is caused affecting all the sub-sequent processes, as well.

BRIEF SUMMARY

An approach is provided that receives an audio stream and utilizes a voice activation detection (VAD) process to create a digital audio stream of voices from at least two different speakers. An automatic speech recognition (ASR) process is applied to the digital stream with the ASR process resulting in the spoken words to which a speaker turn detection (STD) process is applied to identify a number of speaker segments with each speaker segment ending at a word boundary. A speaker clustering algorithm is then applied to the speaker segments to associate one of the speakers with each of the speaker segments.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 7 is an exemplary flowchart depicting steps taken to complete the speaker turn detection process; and FIG. 8 is an exemplary flowchart depicting steps taken to build a transcript indicating text spoken by the different people in a discussion as well as ingesting the transcript into a question answering (QA) system.

DETAILED DESCRIPTION

Figure 1:
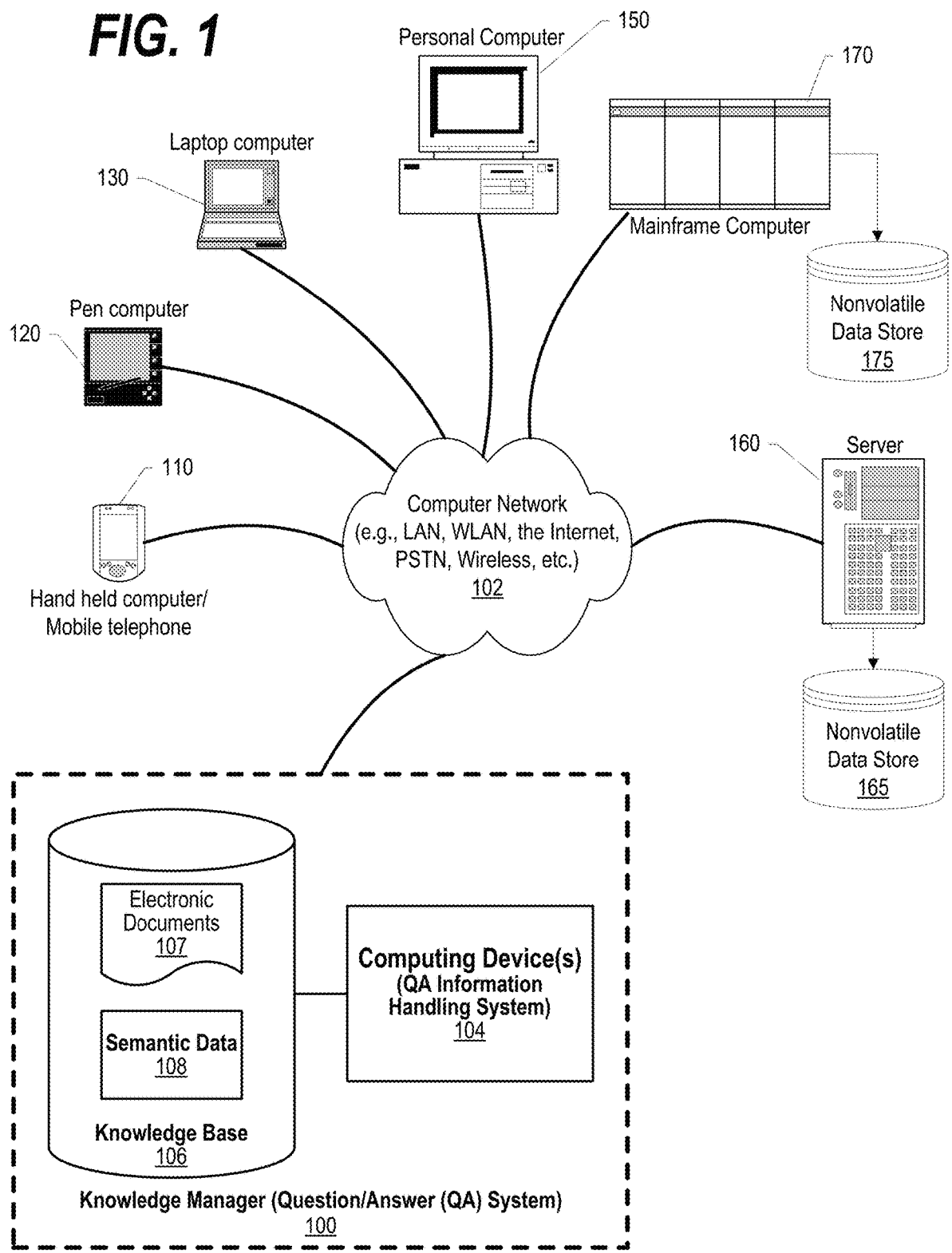
FIG. 1 depicts a schematic diagram of one illustrative embodiment of a question/answer creation (QA) system in a computer network.
Figure 2:
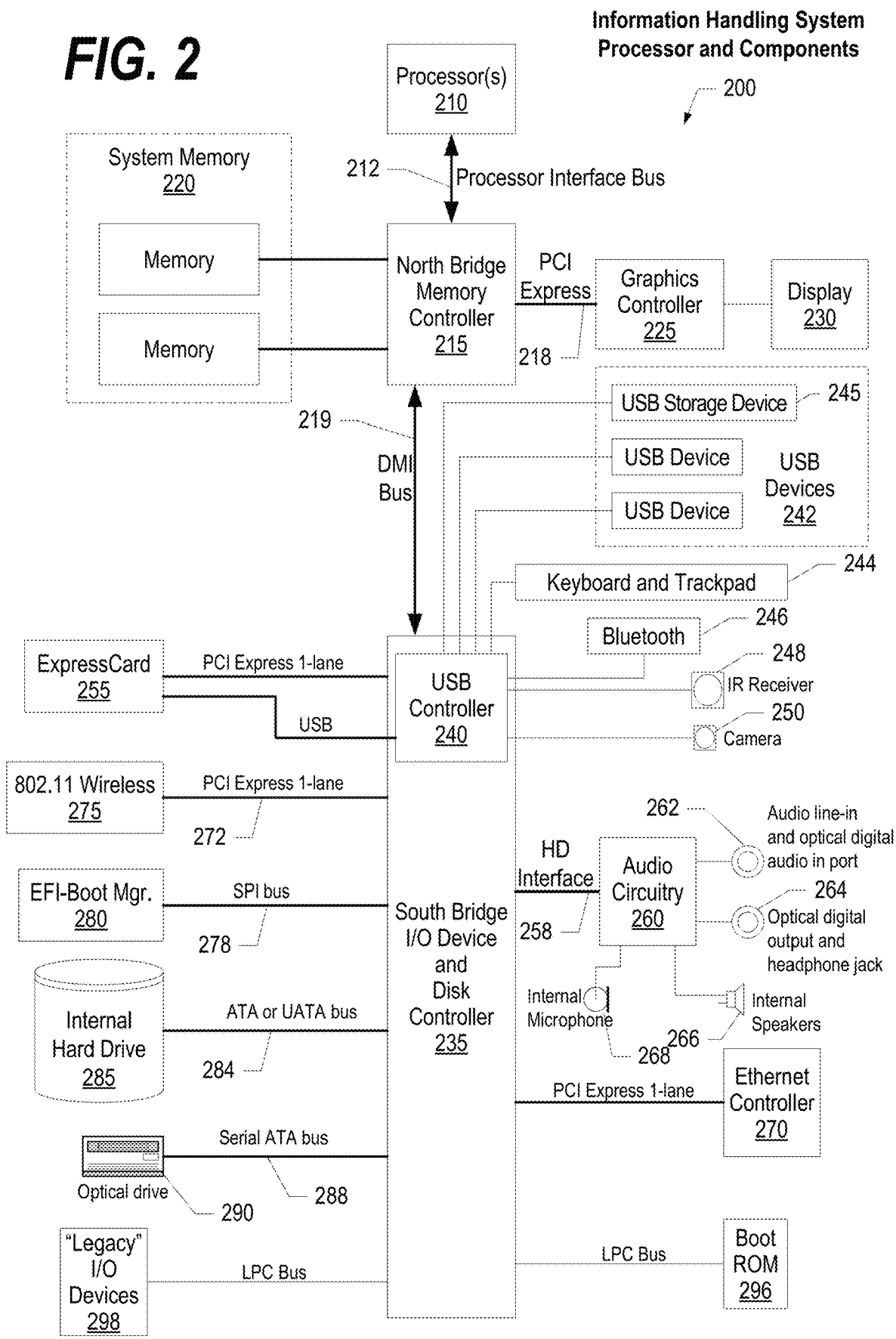
FIG. 2 illustrates an information handling system, more particularly, a processor and common components, which is a simplified example of a computer system capable of performing the computing operations described herein.

FIGS. 1-8 depict an approach that can be executed on the information handling system shown in FIGS. 1-2. The approach described in FIGS. 3-8 provides for voice activity detection (VAD) to feed data to an automatic speech recognition system that feeds data to a speaker turn detection function that inputs data to a speaker clustering function.

The proposed approach can address most of the issues mentioned above for the following reasons. First, the VAD followed by ASR filters out most of the non-speech segments, improving consequently the quality of the statistics. The ASR output now corresponds to specific words estimated by the decoder, so there are no non-verbal segments included in the post-ASR pipeline. A basic assumption utilized by the approach is that each speaker will utter a whole word before a speaker turn occurs. In other words, the speaker turns occur at the word boundaries, as estimated by the ASR output, rather than essentially anywhere in the audio stream as implemented in traditional systems.

The benefits of this approach are significant including enhanced performance and complexity. The turn detection is now performed on the word boundaries as provided by the ASR hypothesis. The benefits from this approach are multiple: ASR cannot be affected by the diarization process (since diarization now follows the ASR process). The minimum length of the investigated speech segments is now at least a word's length, thus making the statistics estimation more robust. Also, the number of potential changes is now an order of magnitude smaller than the brute-force approach. For example, in this approach a one second audio segment may contain five words which could represent at most five potential speaker turns. In contrast, the brute force approach used in traditional systems investigates the speaker turns after every so many milliseconds (e.g., 50 milliseconds, etc.), so that a one second audio may represent, instead, up to 20 potential speaker turns. Consequently, the approach described herein is more efficient than traditional systems allowing the approach to perform efficiently and in near real-time.

Finally, the proposed system is intuitively closer to the human perception where every word is assigned to a single speaker. The proposed system was also compared against the brute-force approach in terms of the speaker clustering errors and the diarization errors were found to be 40% lower. This difference in performance is expected for all the reasons explained above. The diarization error is measured as the ratio of frames correctly assigned to each speaker over the number of speech frames found (assigned to any of the speakers). In more detail, 40% better performance means that 40% more frames are assigned to the correct speaker (if the found speech remains the same—something that is directly affected by the VAD and the ASR performance).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
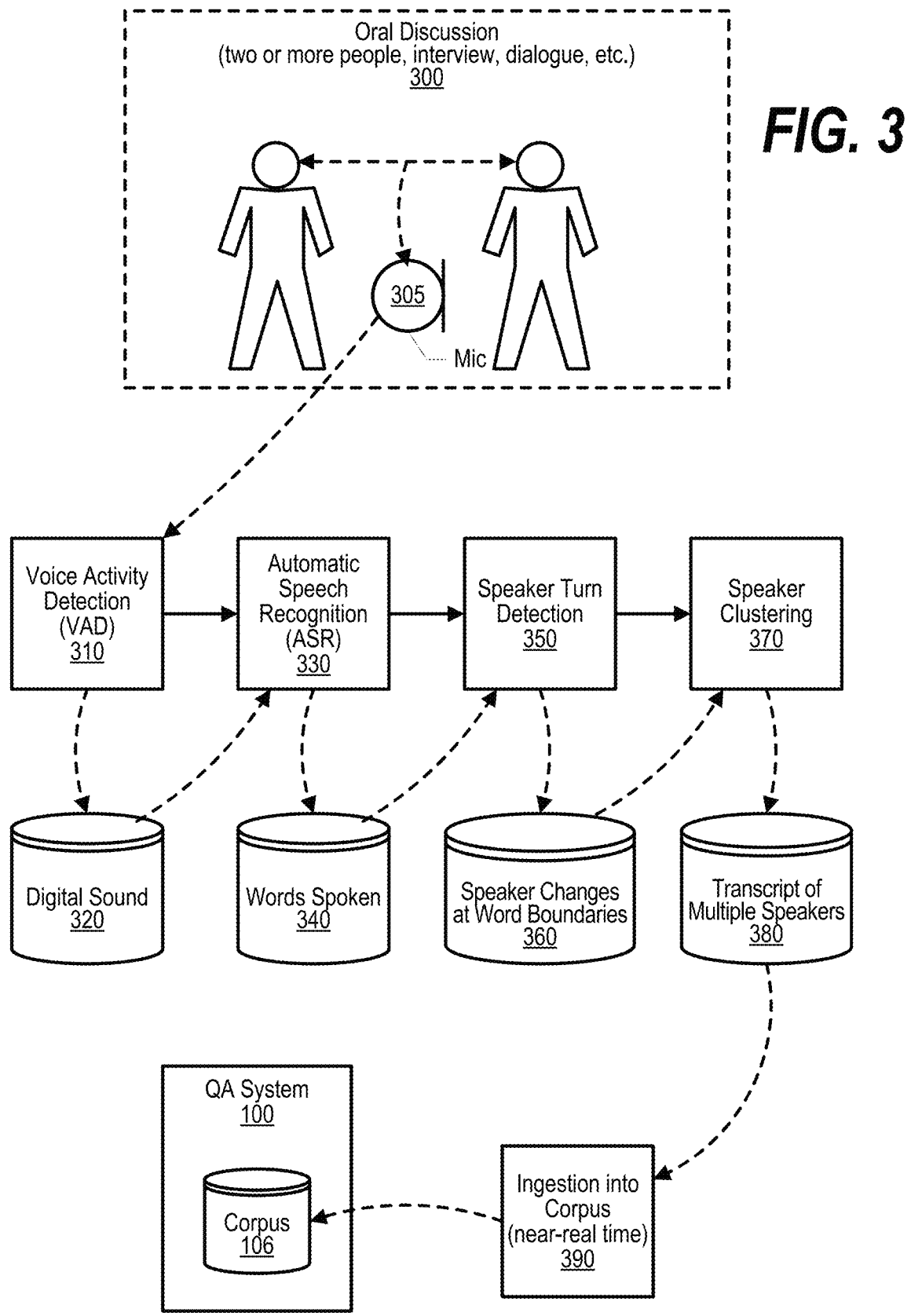
FIG. 3 is an exemplary diagram depicting diarization of a discussion being driven by ASR based segmentation.

FIG. 3 is an exemplary diagram depicting diarization of a discussion being driven by ASR based segmentation. Discussion box 300 depicts two or more people having a discussion, such as an interview, dialogue, or the like. The discussion is recorded by microphone 305.

Voice Activity Detection (VAD) process 310 is a traditional VAD process that detects the presence or absence of human speech. VAD is used in speech coding and speech recognition. The sounds (human speech) detected by process 310 are stored in digital sound stream 320.

Automatic Speech Recognition (ASR) process 330 processes audio stream 320 and results in a sequence of words in the order that the words were spoken by the participants of the discussion. The spoken words that result from process 330 are stored in data store 340.

Speaker Turn Detection (STD) process 350 is applied to the spoken words and results in numerous speaker segments where each speaker segment ends on a word boundary. The speaker segments with speaker changes that occur on word boundaries are stored in data store 360.

Speaker clustering algorithm 370 is then applied to the speaker segments. The speaker clustering algorithm associates one of the human speakers with each one of the speaker segments. The result of speaker clustering 370 is a transcript of the multiple speakers that indicate which speaker spoke which segments during the discussion. The transcript of the multiple speakers is stored in data store 380.

In one embodiment, the transcript that is stored in data store 380 is ingested to question answering (QA) system 100 using ingestion process 390 where the transcript is ingested into corpus 106 that is utilized by the QA system when answering questions. In one embodiment, processes 310, 330, 350, 370, and 390 can be performed sequentially with the discussion being ingested into QA system in near real time from the time that the discussion occurred.

Figure 4:
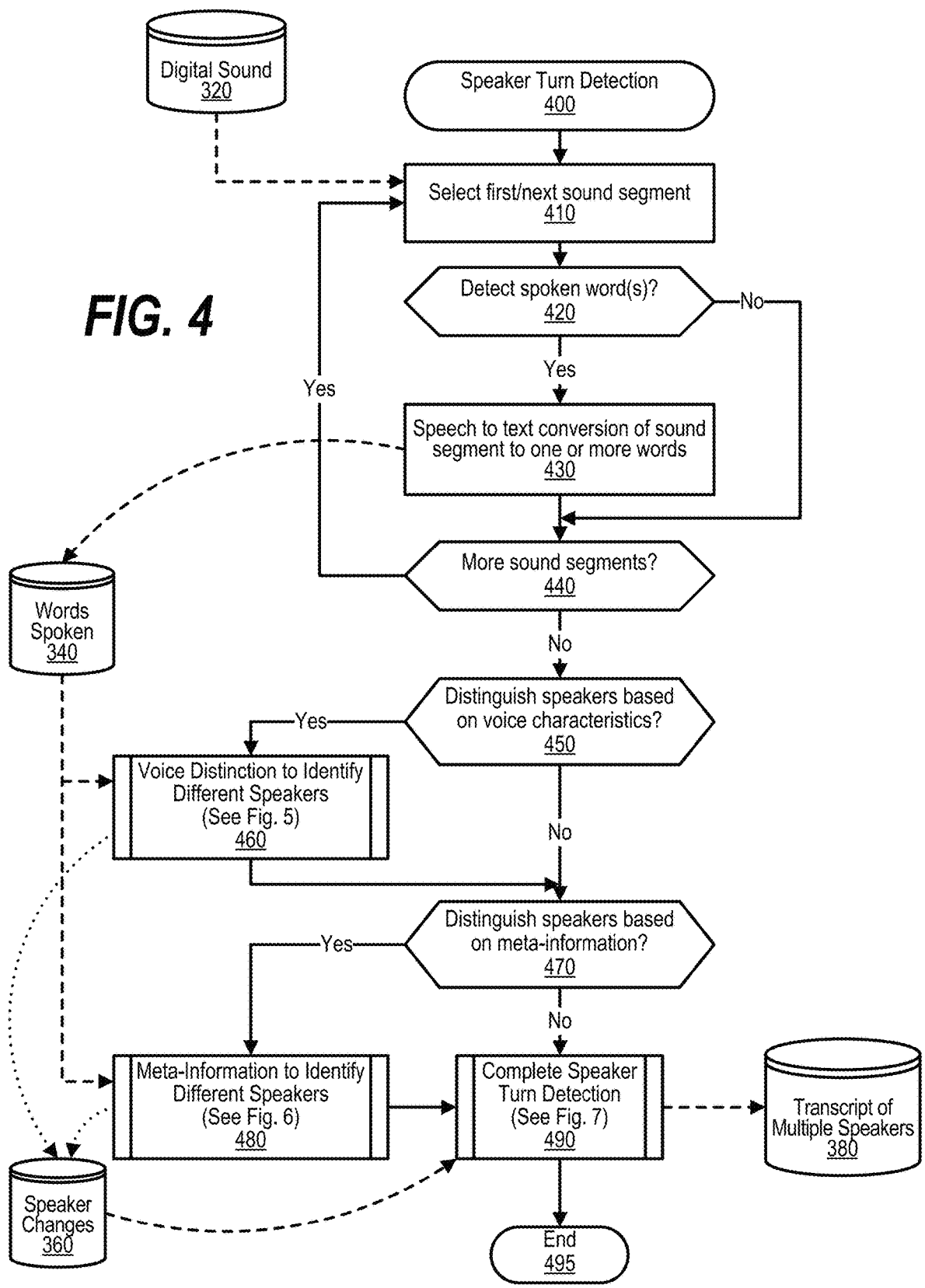
FIG. 4 is an exemplary flowchart depicting steps taken by a speaker turn detection process.

FIG. 4 is an exemplary flowchart depicting steps taken by a speaker turn detection process utilized in the approach described herein. FIG. 4 processing commences at 400 and shows the steps taken by the Speaker Turn Detection process. At step 410, the process selects the first sound segment from the audio sound stream that is stored in data store 320. The process determines as to whether any spoken words are detected in the selected sound segment (decision 420). If any spoken words are detected in the selected sound segment, then decision 420 branches to the 'yes' branch whereupon, at step 430 the process performs a speech to text conversion process on the sound segment generating one or more words that are stored in data store 340. On the other hand, if no spoken words are detected in the selected sound segment, then decision 420 branches to the 'no' branch bypassing step 430. The process determines as to whether there are any more sound segments in data store 320 to process (decision 440). If there are more sound segments, then decision 440 branches to the 'yes' branch which loops back to step 410 to select and process the next sound segment as described above. This looping continues until all of the sound segments have been processed, at which point decision 440 branches to the 'no' branch exiting the loop.

The process determines as to whether, as configured, the various speakers in the digital sound stream are being distinguished based on their voice characteristics (decision 450). If speakers are being distinguished based on their voice characteristics, then decision 450 branches to the 'yes' branch whereupon, at predefined process 460, the process performs the Voice Distinction to Identify Different Speakers routine (see FIG. 5 and corresponding text for processing details) with predefined process 460 adding speaker change indicators and data to data store 360. On the other hand, if speakers are not being distinguished based on their voice characteristics, then decision 450 branches to the 'no' branch bypassing predefined process 460.

The process determines as to whether, as configured, the various speakers in the digital sound stream are being distinguished based on their meta-information derived from the content included in the various sound segments (decision 470). If speakers are being distinguished based on such meta-information, then decision 470 branches to the 'yes' branch whereupon, at predefined process 480, the process performs the Meta-Information to Identify Different Speakers routine (see FIG. 6 and corresponding text for processing details) with predefined process 480 adding speaker change indicators and data to data store 360. On the other hand, if speakers are not being distinguished based on the meta-information derived from the content in the sound segments, then decision 450 branches to the 'no' branch bypassing predefined process 480.

At predefined process 490, the process performs the Complete Speaker Turn Detection routine (see FIG. 7 and corresponding text for processing details), with predefined process 490 completing the speaker turn detection processing that commenced in FIG. 4. In one embodiment, predefined process 490 takes the sound segments and uses the data and speaker change indicators stored in data store 360 to generate a transcript of the discussion between the multiple people with indicators showing which speakers spoke which sound segments. This transcript is stored in data store 380 and can be further ingested into a question answering (QA) system, as shown as element 100 in FIG. 1. FIG. 4 processing thereafter ends at 495.

Figure 5:
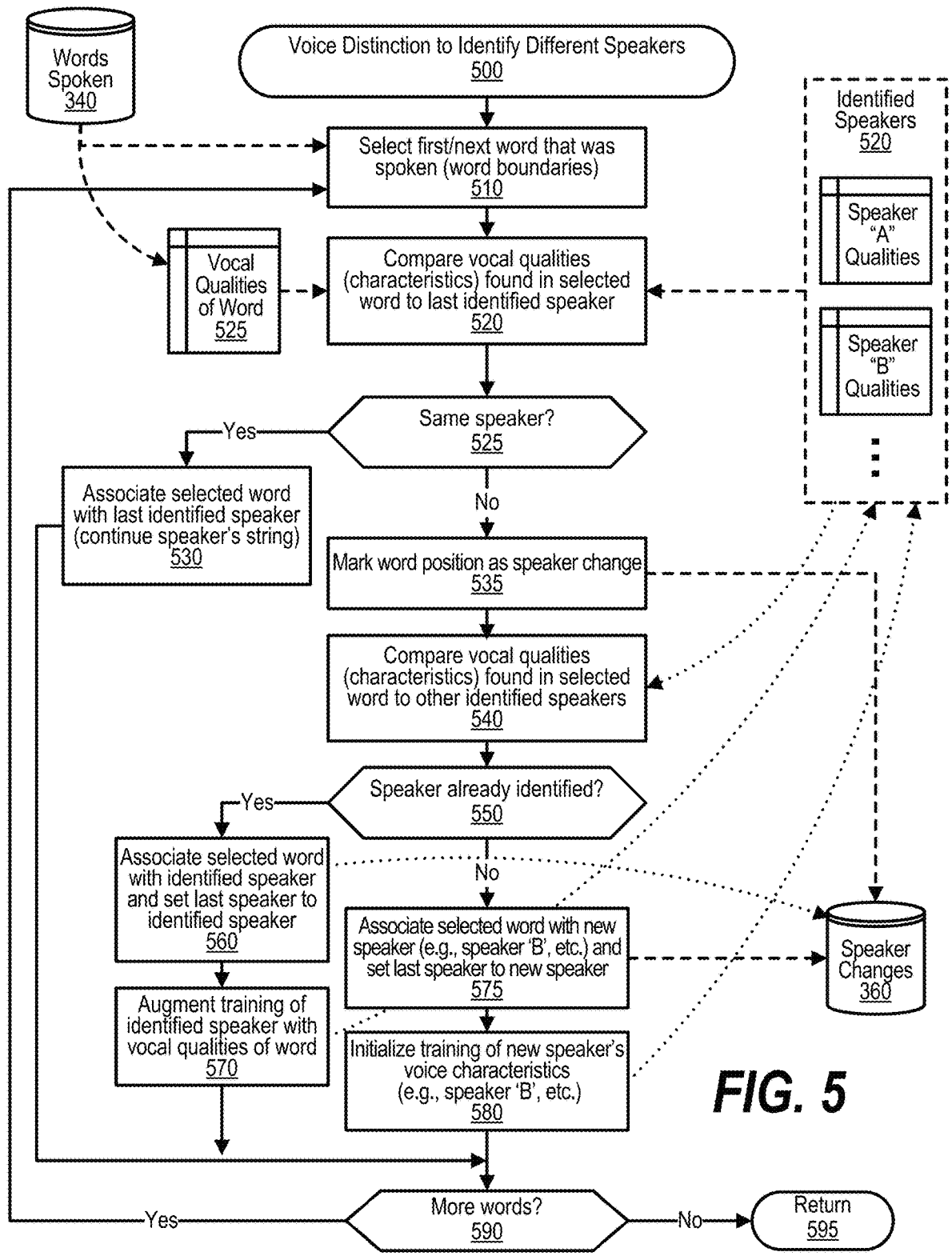
FIG. 5 is an exemplary flowchart depicting steps taken by a process that uses voice distinction to identify different speakers in a discussion.

FIG. 5 is an exemplary flowchart depicting steps taken by a process that uses voice distinction to identify different speakers in a discussion. FIG. 5 processing commences at 500 and shows the steps taken by a process that uses voice distinction to identify the different speakers in a discussion. At step 510, the process selects the first word that was spoken with distinction of speakers being performed on word boundaries, rather than sampling at a particular timing interval. At step 520, the process compares the vocal qualities, or (characteristics, found in the selected word to the voice qualities of the last identified speaker (if at least one word has already been processed, otherwise the first word is associated with the first speaker). The process determines whether the same speaker that spoke the selected word also spoke the previously spoken word (decision 525). If the words were spoken by the same speaker, then decision 525 branches to the 'yes' branch whereupon, at step 530, the process associates the selected word with the last identified speaker, thus continuing the speaker's string of words spoken.

On the other hand, if the comparison reveals that the selected word was spoken by someone other than the person that spoke the previous word, then decision 525 branches to the 'no' branch to perform steps 535 through 580. At step 535, the process marks the word position (boundary between the previously spoken word and the selected word) as a place where a speaker change occurred and stores the data in data store 360. At step 540, the process compares the vocal qualities, or characteristics, found in the selected word to the vocal qualities of the other (previously) identified speakers with the other speaker quality data being retrieved from memory area 520. The process next determines whether the speaker of the selected word has already been identified with a successful match of the vocal qualities of the selected word and the vocal qualities of one of the already known speakers (decision 550).

If the speaker matching the vocal qualities has already been identified, then decision 550 branches to the 'yes' branch to perform steps 560 and 570. On the other hand, if step 540 was unable to match the vocal qualities of the selected word with an already known speaker (representing a new speaker to the discussion), then decision 550 branches to the 'no' branch to perform steps 575 and 580. Steps 560 and 570 are performed when the vocal qualities of the selected word match an already known speaker. At step 560, the process associates the selected word with an already identified speaker and also sets the last speaker variable to the identified speaker (e.g., Speaker "B", etc.). At step 570, the process augments the training of the identified speaker with the vocal qualities found in the selected word. In one embodiment, the more words that are trained as coming from a particular speaker, the better the process is at making a successful comparison at step 540. This augmented training data is stored in memory area 520 and associated with the identified speaker.

Steps 575 and 580 are performed when the vocal qualities of the selected word did not match any of the already known speakers (representing a new speaker to the discussion). At step 575, the process associates the selected word with a new speaker (e.g., speaker CB', "C", etc.) and sets the last speaker variable to the new speaker. At step 580, the process initializes training of the new speaker's voice characteristics (e.g., speaker CB', etc.) using the voice qualities found in the selected word.

The process next determines whether there are more words needed to be processed (decision 590). If there are more words to process, then decision 590 branches to the 'yes' branch which loops back to step 510 to select and process the next word from data store 340 as described above. This looping continues until all of the words have been processed, at which point decision 590 branches to the 'no' branch exiting the loop. FIG. 5 processing thereafter returns to the calling routine (see FIG. 4) at 595.

Figure 6:
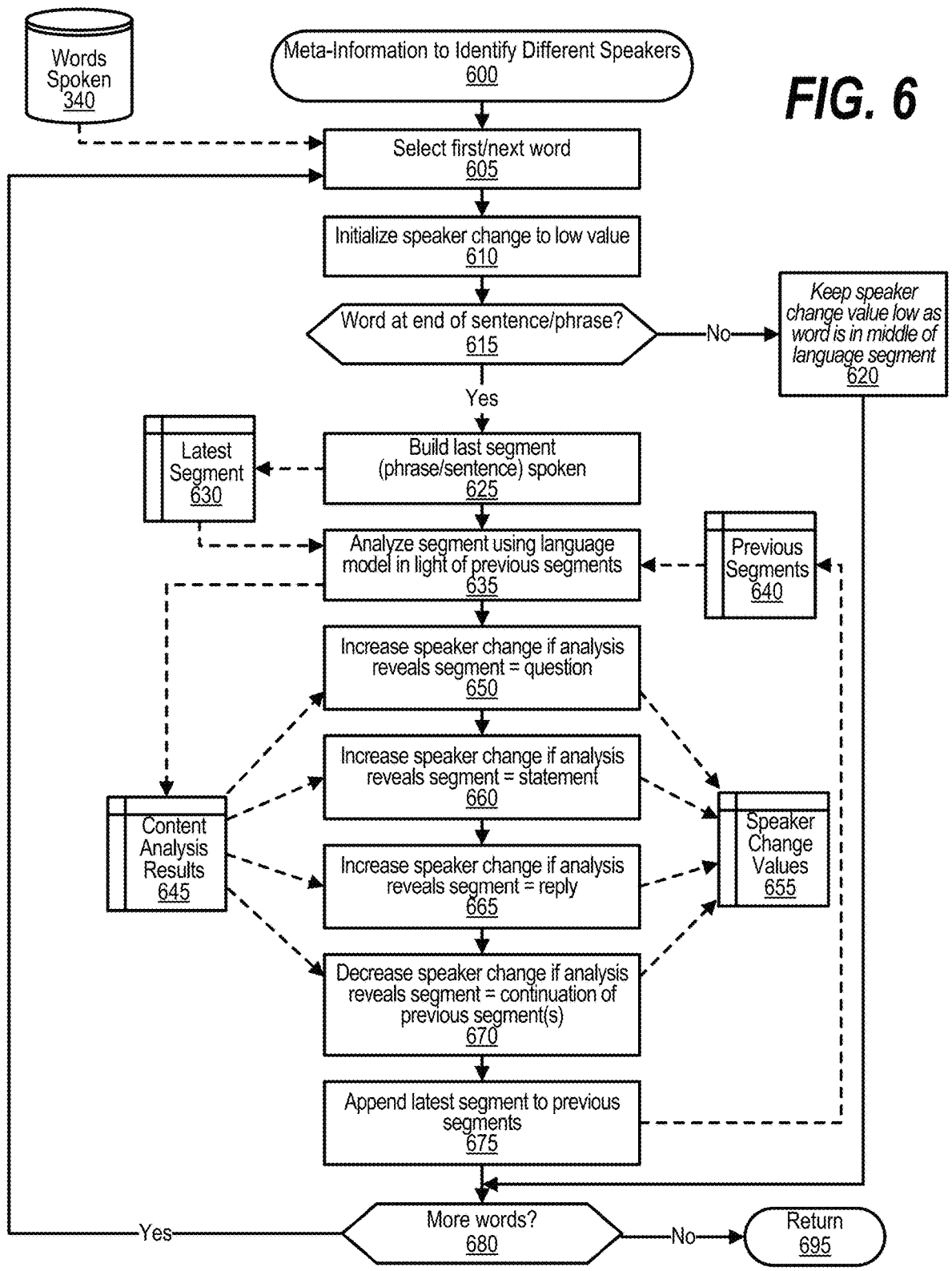
FIG. 6 is an exemplary flowchart depicting steps taken by a process that uses meta-information identified in the content of the discussion to identify speaker changes.

FIG. 6 is an exemplary flowchart depicting steps taken by a process that uses meta-information identified in the content of the discussion to identify speaker changes. FIG. 6 processing commences at 600 and shows the steps taken by a process that uses meta-information extracted from the content of sound segments to identify the different speakers in a discussion. At step 605, the process selects the first word from data store 340. At step 610, the process initializes the speaker change variable to low value with a low value indicating that a speaker change is less likely, while a higher value indicates that a speaker change is more likely. The process determines as to whether the selected word is at the end of a sentence or phrase (decision 615). If the word is at the end of a sentence or phrase, then decision 615 branches to the 'yes' branch whereupon at step 620, the process keeps speaker change value low as word is in middle of language segment. Note that conversational cues, such as interruptions, can be identified using the vocal quality characteristics process shown in FIG. 5.

On the other hand, if the word is not at the end of a sentence or phrase, then decision 615 branches to the 'no' branch to perform steps 625 through 675. At step 625, the process builds a last vocal segment (e.g., a phrase, sentence, etc.) that was ended by the selected word and stores the last segment in memory area 630. At step 635, the process analyzes the last segment using a language model in light of previous segments that were spoken. In one embodiment, the language model is dependent on the language (e.g., English, Spanish, etc.) that is being spoken during the discussion. At step 650, the process increases the speaker change value if the analysis reveals that the last segment is found to be a question. At step 660, the process increases the speaker change value if the analysis reveals that the last segment is found to be a statement. At step 665, the process increases speaker change value if the analysis reveals that the last segment is found to be a reply. At step 670, the process decreases the speaker change if the analysis reveals that the last segment is found to be a continuation of one or more previous (successive) segments. At step 675, the process appends the latest (current) segment to the string of previous segments stored in memory area 640.

The process determines whether there are more words to process from data store 340 (decision 680). If there are more words to process, then decision 680 branches to the 'yes' branch which loops back to select and process the next word as described above. This looping continues until all of the words have been processed, at which point decision 680 branches to the 'no' branch exiting the loop. FIG. 6 processing thereafter returns to the calling routine (see FIG. 4) at 695.

FIG. 7 is an exemplary flowchart depicting steps taken to complete the speaker turn detection process. FIG. 7 processing commences at 700 and shows the steps taken by a process that completes the speaker turn detection process that commenced in FIG. 4. At step 710, the process selects the first speaker change from data store 360. At step 720, the process identifies the position of the selected speaker change value in memory area 620 with the speaker change values being provided by meta-information derived from the content analysis shown in FIG. 6. At step 730, the process combines the meta-information change value(s) generated from the content analysis with the voice distinction data provided by the vocal analysis process shown in FIG. 5 with the combination used to determine whether a speaker change occurred.

The process determines as to whether the combination of the meta-information speaker change value and the voice distinction speaker change value indicates that a speaker change occurred at this location, or position, in the discussion (decision 740). If a speaker change is found to occur at this location, then decision 740 branches to the 'yes' branch whereupon, at step the speaker change is confirmed as occurring at this location. On the other hand, if no speaker change is found to occur at this location, then decision 740 branches to the 'no' branch whereupon, at step 760, the process removes the speaker change from this location in data store 360 as the process has found that a speaker change actually did not occur at this location in the discussion.

The process determines whether there are more speaker changes in data store 360 yet to be processed (decision 770). If there are more speaker changes, then decision 770 branches to the 'yes' branch which loops back to step 710 to select and process the next set of speaker change data as described above. This looping continues until there are no more speaker changes to process, at which point decision 770 branches to the 'no' branch exiting the loop. At step 775, the process identifies any speaker change values that exceed a threshold and are not yet associated with speaker change. These would be speaker changes indicated by the meta-information and stored in memory area 620 but not necessarily indicated by the voice quality differentiation data detected and stored in data store 360. At step 780, the process re-analyzes the vocal quality and characteristics data at the locations where the speaker change value from the meta-information indicated a possible speaker change and the process updates any speaker changes as needed as result of the re-analysis. The updates to the speaker changes are stored in data store 360.

At predefined process 790, the process performs the Build Transcript routine (see FIG. 8 and corresponding text for processing details). Predefined process 790 builds a transcript indicating the speaker of particular segments found in the audio stream with the textual transcript stored in data store 380.

FIG. 8 is an exemplary flowchart depicting steps taken to build a transcript indicating text spoken by the different people in a discussion as well as ingesting the transcript into a question answering (QA) system. FIG. 8 processing commences at 800 and shows the steps taken by a process that builds a transcript detailing the discussion between two or more people and indicating which speaker said which words. At step 810, the process selects the first speaker change that is stored in data store 360. At step 820, the process retrieves the speaker that was identified as saying the words (e.g., "speaker 'A', "John Doe," etc.). At step 830, the process retrieves a string, or stream, of words up to the next speaker change or until the end of the file with the words spoken being received from data store 340 and the next speaker change being retrieved from data store 360. At step 840, the process writes the identifier of the speaker and the words that were spoken by this speaker to the transcript that is stored in data store 380. The process determines whether there are more speaker changes to process in data store 360 (decision 850). If there are more speaker changes, then decision 850 branches to the 'yes' branch which loops back to step 810 to select and process the next speaker change as described above. This looping continues until there are no more speaker changes, at which point decision 850 branches to the 'no' branch exiting the loop.

The process determines as to whether the transcript that was created and stored in data store 380 is to be ingested into the corpus utilized by a question answering (QA) system (decision 860). If the transcript is being ingested, then decision 860 branches to the 'yes' branch whereupon, at step 870, the transcript stored in data store 380 is ingested into corpus 106 that is utilized by QA system 100 system 100. On the other hand, the transcript is not being ingested, then decision 860 branches to the 'no' branch bypassing step 870. FIG. 8 processing thereafter returns to the calling routine (see FIG. 7) at 895.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving an audio stream that comprises both a plurality of speech segments corresponding to a plurality of human speakers and a plurality of non-verbal segments;
   utilizing a voice activation detection (VAD) process on the audio stream, wherein an output of the VAD process is a digital audio stream of voices corresponding to the plurality of speech segments;
   inputting the VAD process output into an automatic speech recognition (ASR) process, wherein an output of the ASR process comprises a plurality of spoken words corresponding to the plurality of speech segments and is devoid of the plurality of non-verbal segments;
   inputting the ASR process output to a speaker turn detection (STD) process, wherein the STD process generates a plurality of speaker segments that each end at a word boundary of one of the plurality of spoken words; and
   applying a speaker clustering algorithm to the plurality of speaker segments, wherein the speaker clustering algorithm associates an identifier of one of the human speakers with each of the speaker segments.

2. The method of claim 1 further comprising:
   generating a textual transcript of the audio stream by outputting each of the speaker segments and the identifier of the associated human speaker.

3. The method of claim 1 further comprising:
ingesting the textual transcript into a question answering (QA) system corpus.

4. The method of claim 1 further comprising:
identifying a plurality of sets of vocal qualities from the audio stream, wherein each of the sets of vocal qualities corresponds to a different one of the plurality of human speakers;
comparing the plurality of sets of vocal qualities to each of the plurality of spoken words; and
associating one of the human speakers to each of the words based on the comparison.

5. The method of claim 4 wherein a change from a first of the plurality of human speaker to a second of the plurality of human speakers is limited to word boundaries found in the plurality of spoken words.

6. The method of claim 1 wherein the speaker detection process further comprises:
associating a first word from the plurality of spoken words to a first set of vocal qualities;
identifying a second word from the plurality of spoken words that is successive to the first word and corresponds to a second set of vocal qualities;
inserting a speaker change mark between the first word and the second word in response to determining that the first set of vocal qualities is different from the second set of vocal qualities;
adjusting a speaker change probability value in response to determining that the first word is at an end of a question; and
maintaining the speaker change mark between the first word and the second word based on the adjusted speaker change probability value.

7. The method of claim 6 further comprising:
analyzing a selected one of the speaker segments corresponding to the first word using a language model, wherein the analysis:
increases the speaker change probability value in response to the selected speaker segment indicating a statement;
increases the speaker change probability value in response to the selected speaker segment indicating a reply; and
decreases the speaker change probability value in response to the selected speaker segment indicating a continuation of a previous speaker segment; and
identifying the second word based on the speaker change probability value and the comparison of the second word to the first set of vocal qualities.

8. An information handling system comprising:
one or more processors;
a memory coupled to at least one of the processors; and
a set of computer program instructions stored in the memory and executed by at least one of the processors in order to perform actions of:
receiving an audio stream that comprises both a plurality of speech segments corresponding to a plurality of human speakers and a plurality of non-verbal segments;
utilizing a voice activation detection (VAD) process on the audio stream, wherein an output of the VAD process is a digital audio stream of voices corresponding to the plurality of speech segments;
inputting the VAD process output into an automatic speech recognition (ASR) process, wherein an output of the ASR process comprises a plurality of spoken words corresponding to the plurality of speech segments and is devoid of the plurality of non-verbal segments;
inputting the ASR process output to a speaker turn detection (STD) process, wherein the STD process generates a plurality of speaker segment that each end at a word boundary of one of the plurality of spoken words; and
applying a speaker clustering algorithm to the plurality of speaker segments, wherein the speaker clustering algorithm associates an identifier of one of the human speakers with each of the speaker segments.

9. The information handling system of claim 8 wherein the actions further comprise:
generating a textual transcript of the audio stream by outputting each of the speaker segments and the identifier of the associated human speaker.

10. The information handling system of claim 8 wherein the actions further comprise:
ingesting the textual transcript into a question answering (QA) system corpus.

11. The information handling system of claim 8 wherein the actions further comprise:
identifying a plurality of sets of vocal qualities from the audio stream, wherein each of the sets of vocal qualities corresponds to a different one of the plurality of human speakers;
comparing the plurality of sets of vocal qualities to each of the plurality of spoken words; and
associating one of the human speakers to each of the words based on the comparison.

12. The information handling system of claim 11 wherein a change from a first of the plurality of human speaker to a second of the plurality of human speakers is limited to word boundaries found in the plurality of spoken words.

13. The information handling system of claim 8 wherein the actions further comprise:
associating a first word from the plurality of spoken words to a first set of vocal qualities;
identifying a second word from the plurality of spoken words that is successive to the first word and corresponds to a second set of vocal qualities;
inserting a speaker change mark between the first word and the second word in response to determining that the first set of vocal qualities is different from the second set of vocal qualities;
adjusting a speaker change probability value in response to determining that the first word is at an end of a question; and
maintaining the speaker change mark between the first word and the second word based on the adjusted speaker change probability value.

14. The information handling system of claim 13 wherein the actions further comprise:
analyzing a selected one of the speaker segments corresponding to the first word using a language model, wherein the analysis:
increases the speaker change probability value in response to the selected speaker segment indicating a statement;
increases the speaker change probability value in response to the selected speaker segment indicating a reply; and
decreases the speaker change probability value in response to the selected speaker segment indicating a continuation of a previous speaker segment; and identifying the second word based on the speaker change probability value and the comparison of the second word to the first set of vocal qualities.

15. A computer program product stored in a computer readable storage medium, comprising computer program code that, when executed by an information handling system, causes the information handling system to perform actions comprising:

receiving an audio stream that comprises both a plurality of speech segments corresponding to a plurality of human speakers and a plurality of non-verbal segments;

utilizing a voice activation detection (VAD) process on the audio stream, wherein an output of the VAD process is a digital audio stream of voices corresponding to the plurality of speech segments;

inputting the VAD process output into an automatic speech recognition (ASR) process, wherein an output of the ASR process comprises a plurality of spoken words corresponding to the plurality of speech segments and is devoid of the plurality of non-verbal segments;

inputting the ASR process output to a speaker turn detection (STD) process, wherein the STD process generates a plurality of speaker segments that each end at a word boundary of one of the plurality of spoken words; and applying a speaker clustering algorithm to the plurality of speaker segments, wherein the speaker clustering algorithm associates an identifier of one of the human speakers with each of the speaker segments.

16. The computer program product of claim 15 wherein the actions further comprise:

generating a textual transcript of the audio stream by outputting each of the speaker segments and the identifier of the associated human speaker; and ingesting the textual transcript into a question answering (QA) system corpus.

17. The computer program product of claim 15 wherein the actions further comprise:

identifying a plurality of sets of vocal qualities from the audio stream, wherein each of the sets of vocal qualities corresponds to a different one of the plurality of human speakers;

comparing the plurality of sets of vocal qualities to each of the plurality of spoken words; and associating one of the human speakers to each of the words based on the comparison.

18. The computer program product of claim 17 wherein a change from a first of the plurality of human speaker to a second of the plurality of human speakers is limited to word boundaries found in the plurality of spoken words.

19. The computer program product of claim 15 wherein the actions further comprise:

associating a first word from the plurality of spoken words to a first set of vocal qualities;

identifying a second word from the plurality of spoken words that is successive to the first word and corresponds to a second set of vocal qualities;

inserting a speaker change mark between the first word and the second word in response to determining that the first set of vocal qualities is different from the second set of vocal qualities;

adjusting a speaker change probability value in response to determining that the first word is at an end of a question; and maintaining the speaker change mark between the first word and the second word based on the adjusted speaker change probability value.

20. The computer program product of claim 19 wherein the actions further comprise:

analyzing a selected one of the speaker segments corresponding to the first word using a language model, wherein the analysis:

increases the speaker change probability value in response to the selected speaker segment indicating a statement;

increases the speaker change probability value in response to the selected speaker segment indicating a reply; and decreases the speaker change probability value in response to the selected speaker segment indicating a continuation of a previous speaker segment; and identifying the second word based on the speaker change probability value and the comparison of the second word to the first set of vocal qualities.

* * * * *